W. PRELLWITZ.
CLEARANCE VALVE FOR COMPRESSORS.
APPLICATION FILED APR. 21, 1921.

1,422,476.

Patented July 11, 1922.

INVENTOR
William Prellwitz
BY Herbert C. Ogden
his ATTORNEY

W. PRELLWITZ.
CLEARANCE VALVE FOR COMPRESSORS.
APPLICATION FILED APR. 21, 1921.
1,422,476.
Patented July 11, 1922.
2 SHEETS—SHEET 2.
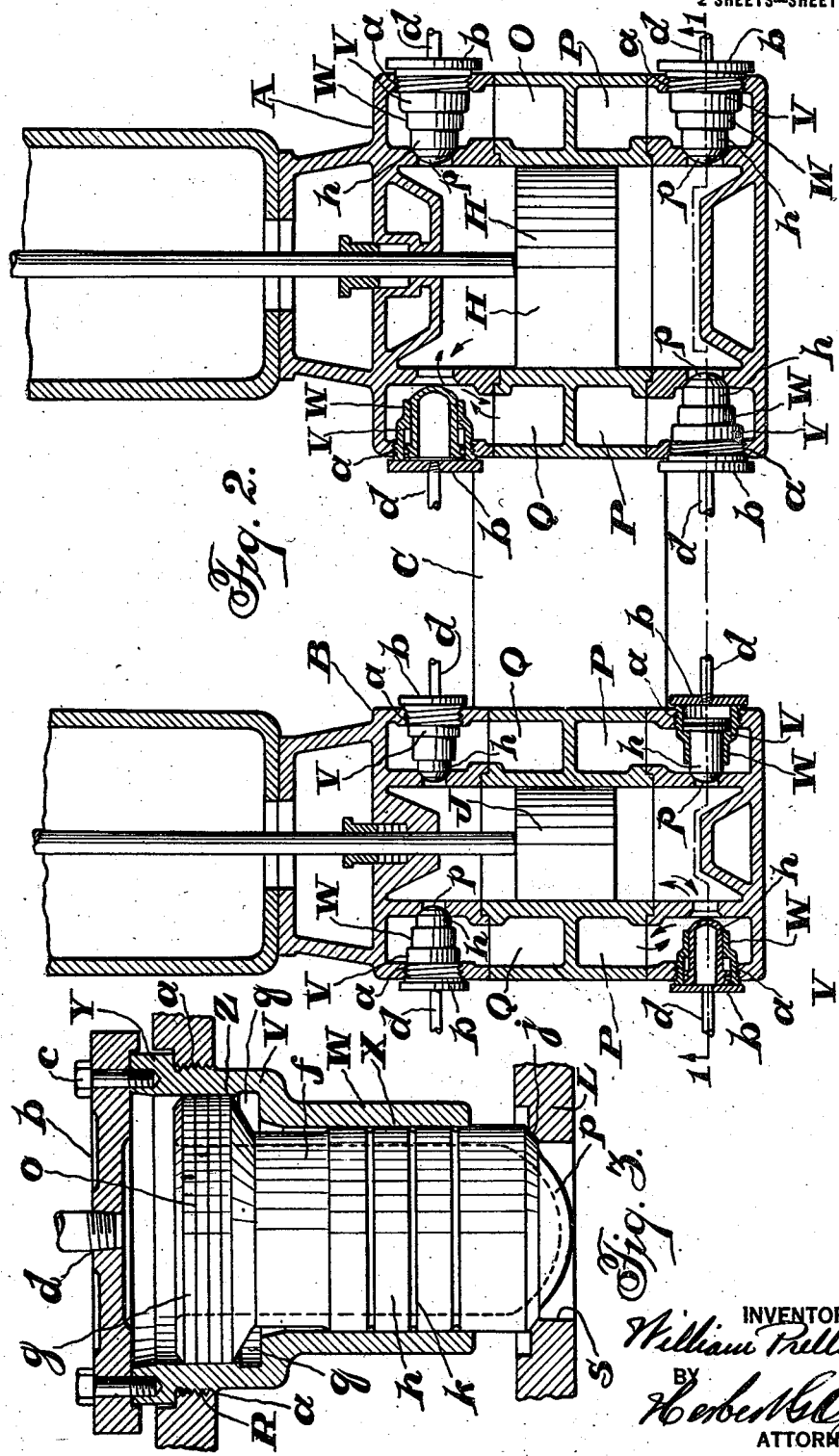

UNITED STATES PATENT OFFICE.

WILLIAM PRELLWITZ, OF EASTON, PENNSYLVANIA, ASSIGNOR TO INGERSOLL-RAND COMPANY, OF JERSEY CITY, NEW JERSEY, A CORPORATION OF NEW JERSEY.

CLEARANCE VALVE FOR COMPRESSORS.

1,422,476.        Specification of Letters Patent.        Patented July 11, 1922.

Application filed April 21, 1921. Serial No. 463,196.

*To all whom it may concern:*

Be it known that I, WILLIAM PRELLWITZ, a citizen of the United States, a resident of Easton, Northampton County, and State of Pennsylvania, have invented a certain Clearance Valve for Compressors, of which the following is a specification accompanied by drawings.

This invention relates to fluid compressors, but more particularly to a clearance valve for controlling the passage of fluid to clearance pockets provided at either end of the compressor cylinder, in order to regulate the load of a compressor at constant speed.

The clearance valve forming the subject matter of this invention is adapted especially for a regulating system for compressors, such as disclosed in my U. S. Patent No. 1,027,760, granted May 28, 1912, in which patent Figure 2ª illustrates a clearance valve upon which my present invention is in some respects an improvement.

Like the clearance valve of my prior patent, my present clearance valve is of the poppet type, as I have found that such type of valve is preferable and is tighter than a piston valve for instance. My present objects are to produce a valve which is located substantially entirely within the walls of the compressor in the clearance pockets, and yet is not erratic in action and will not slam in and out at intervals. The tendency to erratic action and slamming are disadvantages which it is highly desirable, if not imperative, to overcome and my improvement has overcome these difficulties in a clearance valve of the poppet type.

The invention is shown in one of its preferred forms in the accompanying drawings, in which—

Figure 2, is a horizontal sectional plan view on the line 2—2 of Figure 1, and

Figure 3 is an enlarged detail longitudinal sectional view taken through one of the valves.

Figure 1:
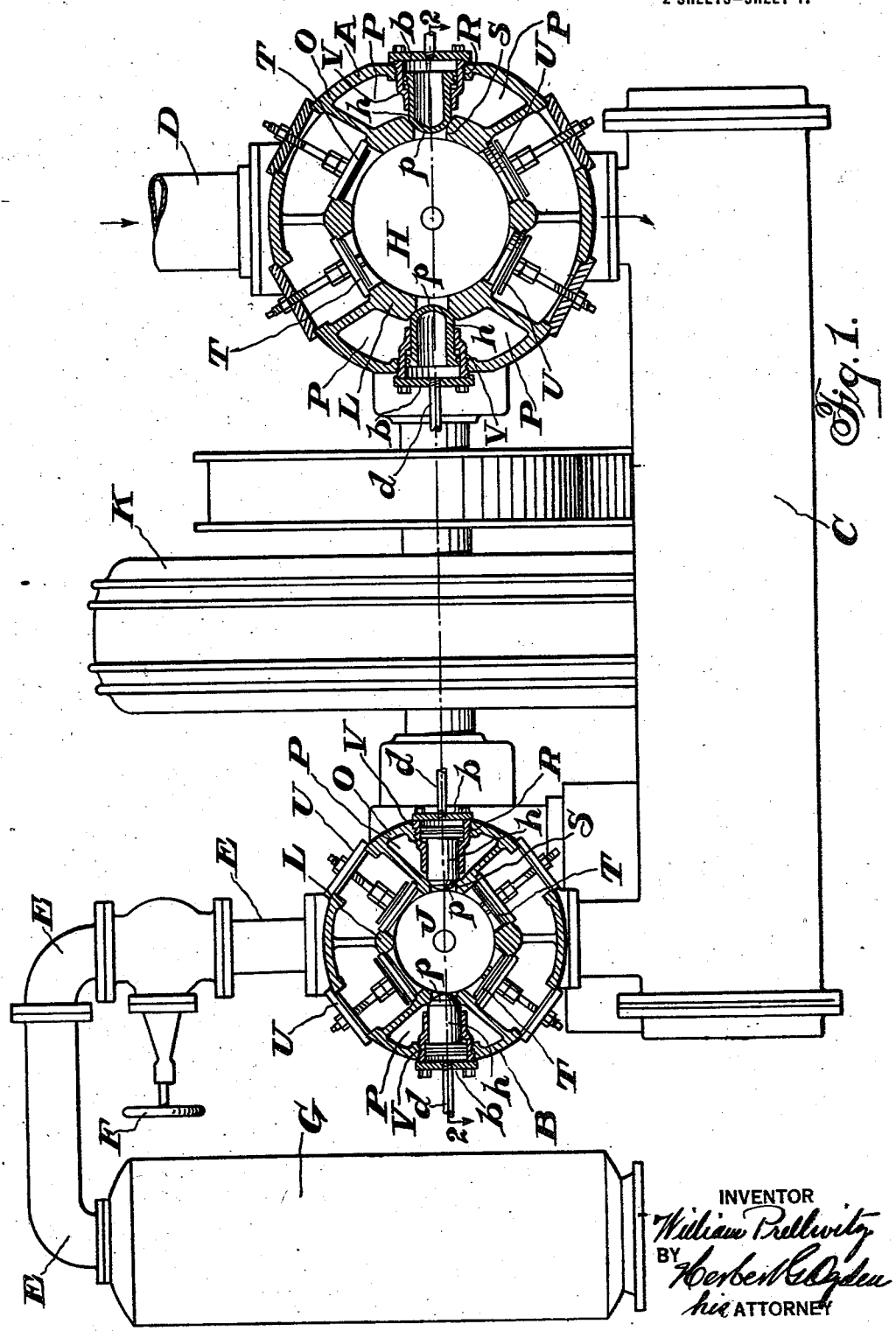
Figure 1 is a transverse sectional elevation of a two stage compressor on the line 1—1 of Figure 2, fitted with my improved clearance valves.

Referring to the drawings, and at first more particularly to Figures 1 and 2, a two stage compressor is shown for the purposes of illustration, having the low pressure cylinder A, the high pressure cylinder B and the intercooler C. Air enters at the intake D and is discharged through the discharge pipe E having the valve F, to the receiver G. The cylinders are provided with the usual pistons H and J and the compressor is driven in this instance by the electric motor K.

The compressor cylinders are constructed within the inner walls L and the outer walls O having clearance pockets P and Q at each end of the cylinders and also provided with aligned openings R and S in said walls for the insertion of the clearance valves. The cylinders are furthermore provided with the usual inlet valves T and discharge valves U of any suitable type, in this instance plate valves being shown.

In accordance with my improved clearance valve construction, cylindrical valve guides V extend inwardly into the clearance pockets from the openings R in the outer walls O of the cylinders. In this instance, the valve guides V are shown separate from the cylinders, but they might be cast as a part of the cylinders. Each guide V is provided with a barrel W having a bore X of smaller diameter, and a head Y having a bore Z of larger diameter. The valve guides V may be threaded into the openings R in the outer walls of the cylinders, as by means of the screw threads $a$ as shown, or otherwise secured in position. A suitable cover $b$ is provided for the outer end of each valve guide, suitably secured thereto as by means of the screws $c$ and suitable means are provided for admitting pressure from an external source to the head of each valve guide, for this purpose an opening being provided in each cover $b$. These openings may be connected by piping $d$ to a suitable regulator (not shown) which admits receiver pressure to the valve guides to operate the clearance valves in one direction.

Within each valve guide V is arranged a cylindrical differential clearance valve $f$ of the poppet type, having an enlarged head $g$ within the head Y of the guide and a smaller body portion $h$ extending through the guide barrel W and adapted to seat at the opening S at the inner wall L of a cylinder, on the seat $j$. The smaller body portion $h$ of the clearance valve is preferably provided with circumferential lubrication grooves $k$ while the enlarged head $g$ of the valve is preferably provided with piston rings $o$.

In the operation of the device, the larger outer pressure area of a clearance valve $f$ is subject to receiver pressure from the regulator, tending to maintain the valve closed on its seat $j$, against variable pressure upon the inner pressure area, formed by the inner end $p$ of the valve and this variable pressure changes with the stroke of the compressor tending to open the valve. By this means, the passage of fluid from the cylinder to the different clearance pockets is controlled in accordance with the load of the compressor at constant compressor speed.

I have found that clearance valves constructed in accordance with this invention operate satisfactorily and well, and are not erratic in action. On the contrary, they act evenly and consistently and do not slam in and out at intervals. Other advantages reside in the fact that the valves will easily and readily center upon their seats and are maintained in alignment by means of valve guides. The space $q$ within the head of a valve guide and between the guide and the head of the valve, is substantially under the pressure in a clearance pocket, since there is sufficient clearance provided between the barrel of the guide and the body portion of the valve and without piston rings to prevent excess pressure in the space $q$.

I claim:

1. In a compressor, a compressor cylinder formed with inner and outer walls having a clearance pocket between them and aligned openings in the walls, a cylindrical valve guide extending inwardly from the opening in the outer wall, said guide having a differential bore and a cover for its outer end, means for admitting pressure from an external source to the outer end of said guide, a cylindrical differential clearance valve of the poppet type movable within said guide and adapted to cooperate with a seat at the said opening in the inner wall of the cylinder, the larger outer pressure area of the valve being subject to said external pressure tending to maintain the valve closed against variable pressure upon the smaller inner pressure area changing with the stroke of the compressor tending to open the valve, whereby the passage of fluid from the cylinder to the clearance pocket is controlled in accordance with the load of the compressor at substantially constant compressor speed.

2. In a compressor, a compressor cylinder formed with inner and outer walls having a clearance pocket between them and aligned openings in the walls, a cylindrical valve guide extending inwardly from the opening in the outer wall provided with a barrel having a bore of smaller diameter and a head having a bore of larger diameter, a cover for the valve guide, means for admitting pressure from an external source to the head of said valve guide, a cylindrical differential clearance valve of the poppet type having an enlarged head within the head of the guide and a smaller body portion extending through the guide barrel and adapted to seat at the said opening at the inner wall of the cylinder, the larger outer pressure area of the valve being subject to said external pressure tending to maintain the valve closed against variable pressure upon the smaller inner pressure area changing with the stroke of the compressor tending to open the valve, whereby the passage of fluid from the cylinder to the clearance pocket is controlled in accordance with the load of the compressor at substantially constant compressor speed.

In testimony whereof I have signed this specification.

WILLIAM PRELLWITZ.